United States Patent
Zandani

(10) Patent No.: US 9,426,169 B2
(45) Date of Patent: Aug. 23, 2016

(54) SYSTEM AND METHOD FOR CYBER ATTACKS ANALYSIS AND DECISION SUPPORT

(71) Applicant: Shay Zandani, Rehovot (IL)

(72) Inventor: Shay Zandani, Rehovot (IL)

(73) Assignee: CYTEGIC Ltd., Rehovot (IL)

( * ) Notice: Subject to any disclaimer, the term of this patent is extended or adjusted under 35 U.S.C. 154(b) by 0 days.

(21) Appl. No.: 13/766,920

(22) Filed: Feb. 14, 2013

(65) Prior Publication Data

US 2013/0227697 A1    Aug. 29, 2013

Related U.S. Application Data

(60) Provisional application No. 61/604,650, filed on Feb. 29, 2012.

(51) Int. Cl.
*H04L 29/06* (2006.01)
*G06F 21/57* (2013.01)
*G06F 21/55* (2013.01)

(52) U.S. Cl.
CPC .......... *H04L 63/1433* (2013.01); *G06F 21/57* (2013.01); *G06F 21/552* (2013.01); *G06F 21/577* (2013.01)

(58) Field of Classification Search
CPC .... G06F 21/57; G06F 21/552; G06F 21/557; H04L 63/1433
USPC ........................................................ 726/25
See application file for complete search history.

(56) References Cited

U.S. PATENT DOCUMENTS

| 6,301,668 | B1 * | 10/2001 | Gleichauf et al. | 726/25 |
|---|---|---|---|---|
| 6,742,128 | B1 * | 5/2004 | Joiner | 726/25 |
| 7,383,579 | B1 * | 6/2008 | Catanzano | G06F 21/51 726/12 |
| 7,552,480 | B1 * | 6/2009 | Voss | G06F 21/577 380/277 |
| 7,823,206 | B2 * | 10/2010 | Sugimoto | G06F 21/6218 726/25 |
| 7,962,960 | B2 * | 6/2011 | Fudge | G06F 11/008 726/25 |
| 8,161,551 | B1 * | 4/2012 | Muttik | G06F 21/57 709/220 |
| 9,282,114 | B1 * | 3/2016 | Dotan | G06F 21/552 |
| 2003/0172020 | A1 * | 9/2003 | Davies et al. | 705/36 |
| 2004/0006704 | A1 * | 1/2004 | Dahlstrom | G06F 21/577 726/25 |
| 2004/0010709 | A1 * | 1/2004 | Baudoin | G06Q 40/08 726/25 |
| 2004/0250121 | A1 * | 12/2004 | Millar | G06F 21/577 726/1 |
| 2005/0144480 | A1 * | 6/2005 | Kim | H04L 63/1433 726/4 |
| 2006/0095970 | A1 * | 5/2006 | Rajagopal | G06F 21/577 726/25 |
| 2006/0173762 | A1 * | 8/2006 | Clater | G06Q 10/06 705/35 |
| 2006/0191012 | A1 * | 8/2006 | Banzhof | G06F 21/577 726/25 |
| 2006/0265324 | A1 * | 11/2006 | Leclerc | G06F 21/577 705/38 |

(Continued)

*Primary Examiner* — Hadi Armouche
*Assistant Examiner* — Shahriar Zarrineh
(74) *Attorney, Agent, or Firm* — Roach Brown McCarthy & Gruber P.C.; Kevin D. McCarthy

(57) ABSTRACT

A method for cyber attack risk assessment, the method including operating at least one hardware processor for: collecting global cyber attack data from a networked resource; collecting organizational profile data from a user, wherein the organizational profile data includes: types of computerized defensive controls employed by the organization, a maturity of each of the computerized defensive controls, and organizational assets each pertaining to a business environment and each associated with at least one of the computerized defensive controls; and computing a cyber attack risk of the organization in real time, by continuously performing the collecting of global cyber attack data and comparing the global cyber attack data to the organizational profile data, to compute a cyber attack risk score for each of the organizational assets.

20 Claims, 8 Drawing Sheets

(56) References Cited

U.S. PATENT DOCUMENTS

| | | | |
|---|---|---|---|
| 2006/0265751 A1* | 11/2006 | Cosquer | H04L 63/1441 726/25 |
| 2007/0143849 A1* | 6/2007 | Adar | G06Q 10/06 726/25 |
| 2007/0186283 A1* | 8/2007 | Brumbaugh | G06F 21/577 726/25 |
| 2008/0028470 A1* | 1/2008 | Remington | G06F 21/33 726/25 |
| 2008/0183520 A1* | 7/2008 | Cutts | G06Q 10/06 705/7.36 |
| 2008/0271124 A1* | 10/2008 | Nisbet | G06F 21/30 726/4 |
| 2009/0030756 A1* | 1/2009 | Riley | G06Q 10/063 705/7.11 |
| 2009/0100077 A1* | 4/2009 | Jung | H04L 12/2602 |
| 2009/0265199 A1* | 10/2009 | Moerdler et al. | 705/7 |
| 2010/0050264 A1* | 2/2010 | Aebig | G06F 21/577 726/25 |
| 2010/0095381 A1* | 4/2010 | Levi | 726/25 |
| 2010/0153156 A1* | 6/2010 | Guinta | G06Q 10/10 705/7.28 |
| 2010/0275263 A1* | 10/2010 | Bennett | G06F 21/577 726/25 |
| 2011/0185432 A1* | 7/2011 | Sandoval et al. | 726/25 |
| 2012/0030767 A1* | 2/2012 | Rippert, Jr. | G06Q 10/10 726/25 |
| 2012/0110633 A1* | 5/2012 | An | H04L 63/1408 726/1 |
| 2012/0174230 A1* | 7/2012 | Hoyt | G06Q 10/06 726/25 |
| 2012/0203590 A1* | 8/2012 | Deb et al. | 705/7.28 |
| 2012/0233698 A1* | 9/2012 | Watters | G06F 21/577 726/25 |
| 2013/0074188 A1* | 3/2013 | Giakouminakis | G06F 21/57 726/25 |
| 2013/0174259 A1* | 7/2013 | Pearcy | H04L 41/0893 726/25 |
| 2013/0198840 A1* | 8/2013 | Drissi | G06F 21/55 726/22 |
| 2014/0019194 A1* | 1/2014 | Anne | G06Q 10/06393 705/7.28 |
| 2014/0137257 A1* | 5/2014 | Martinez | H04L 63/1433 726/25 |

* cited by examiner

Environment V1 – has 2 parents: Enterprises E1 and E3
Environment V3 – has 2 parents: Enterprise E3 and Environment V4
Environment V6 – has 2 parents: Environment Vn and V7 (can be *software systems, infrastructures, others*)

Important: Environments can have parents in different Enterprises.

SYSTEM AND METHOD FOR CYBER ATTACKS ANALYSIS AND DECISION SUPPORT

FIELD OF THE INVENTION

The invention relates to the field of cyber defense.

BACKGROUND

The proliferation of networked computers (e.g. those connected to the Internet) has grown exponentially in recent years. In addition, many local or enterprise networks have connectivity to a network (e.g. the Internet) via a gateway, so that all computers on a business' local network are also accessible to a network (e.g. Internet). Other forms of access, including wireless devices, allowing access to a local or enterprise network, as well as directly to a network (e.g. Internet) are common. In short, network connectivity of computers is quite common.

It is also well known that networked computer may be susceptible to on-line cyber attacks. Such cyber attacks are typically attempts to obtain control or information from the target computer system. A common form of information is data stored pertaining to personal and financial data; however "hackers" or intruders will attempt to obtain any information regarding the target computer system, such as passwords, email addresses, program names, etc. in an attempt to further their illegal goals.

Various companies provide hardware and/or software products for monitoring such attacks, which may record and analyze interactions with a target computer. The vulnerabilities can be determined proactively, such as 'probing' computers on a network to determine if they are vulnerable, as well as reactively, such as examining vulnerability after an intrusion has occurred. One class of products is called vulnerability management systems (VMS) and is well known in the area of computer security. The VMS products can scan or monitor a network and report on vulnerabilities associated with the network. VMS products can provide valuable information in the form of reports regarding the vulnerability of a computer on a network A large business enterprise, which can have tens of thousands of employees working in a country or working in countries across the world, can have thousands of computer systems networked together. Managing the vulnerability of all these computers is a complex task. In some cases, managing the vulnerability of such computers to cyber attacks is done reactively—e.g., only after a computer has been compromised and the compromise detected. Furthermore, the computers can be physically located in various parts of the organization, and for large enterprises, the organization itself can be complex. For many large corporations, there can be numerous subsidiaries and sub-enterprise entities. Indeed, many individuals in a company do not have a complete perspective of the company's organization outside of their immediate workgroup. Consequently, being able to manage computer vulnerabilities for a large enterprise can be very complex and may be carried out on an ad-hoc basis.

Because many large businesses have many networked computers, and because of the frequency of attempts to intrude into their computers, many business have developed computer security organizations whose sole focus is to address such risks and/or cyber attacks. Such personnel require a comprehensive view of the enterprise, both on a human organizational perspective as well as a computer network perspective. In order to address vulnerabilities in the corporate networks, the security people must be able to identify, assess, and react to such threats and vulnerabilities. However, to date, no such tools have been developed to facilitate the management of such problems on a business organization level. Consequently methods and tools for addressing this aspect are required

SUMMARY

The following embodiments and aspects thereof are described and illustrated in conjunction with systems, tools and methods which are meant to be exemplary and illustrative, not limiting in scope.

Disclosed herein is a method for cyber attack risk assessment, the method comprising operating at least one hardware processor for: collecting global cyber attack data from a networked resource; collecting organizational profile data from a user, wherein the organizational profile data comprises: types of computerized defensive controls employed by the organization, a maturity of each of the computerized defensive controls, and organizational assets each pertaining to a business environment and each associated with at least one of the computerized defensive controls; and computing a cyber attack risk of the organization in real time, by continuously performing said collecting of global cyber attack data and comparing the global cyber attack data to the organizational profile data, to compute a cyber attack risk score for each of the organizational assets.

In some embodiments, the method may further provide a risk simulator configured to compute an effect of improving one or more of the computerized defensive controls on the cyber attack risk score.

In some embodiments, the risk simulator may be further configured to perform the computing of the effect for each of different ones of the computerized defensive controls, and to compute a tradeoff between improvement of different ones of the computerized defensive controls and the cyber attack risk score.

In some embodiments, the method may further display a dashboard comprising the cyber attack risk score for each of the organizational assets.

In some embodiments, the display of the dashboard may further enable a drill-down into one or more of the organizational assets, to display one or more computerized defensive controls associated with the one or more of the organizational assets.

In some embodiments, the dashboard may comprise a graphical, dynamic gauge for each of the organizational assets.

In some embodiments, the method may further compute a success probability score of one or more attack agents indicated by the global cyber attack data.

In some embodiments, the method may further compute a success probability score of one or more attack methods indicated by the global cyber attack data.

Further disclosed is a non-transient computer readable medium having stored thereon instructions that, when executed by at least one hardware processor, may cause the at least one hardware processor to collect global cyber attack data from a networked resource, collect organizational profile data from a user, wherein the organizational profile data comprises types of computerized defensive controls employed by the organization, a maturity of each of the computerized defensive controls and organizational assets each associated with at least one of the computerized defensive controls, and compute a cyber attack risk of the organization in real time, by continuously performing said collecting of global cyber attack data and comparing the global cyber attack data to the organizational profile data, to compute a cyber attack risk score for each of the organizational assets.

In some embodiments, the instruction may further cause the at least one hardware processor to provide a risk simulator configured to compute an effect of improving one or more of the computerized defensive controls on the cyber attack risk score.

In some embodiments, the risk simulator may further configured to perform the computing of the effect for each of different ones of the computerized defensive controls, and to compute a tradeoff between improvement of different ones of the computerized defensive controls and the cyber attack risk score.

In some embodiments, the instruction may further cause the at least one hardware processor to display a dashboard comprising the cyber attack risk score for each of the organizational assets.

In some embodiments, the display of the dashboard may further enable a drill-down into one or more of the organizational assets, to display one or more computerized defensive controls associated with the one or more of the organizational assets.

In some embodiments, the dashboard may comprise a graphical, dynamic gauge for each of the organizational assets.

In some embodiments, the instruction may further cause the at least one hardware processor to compute a success probability score of one or more attack agents indicated by the global cyber attack data.

In some embodiments, the instruction may further cause the at least one hardware processor to compute a success probability score of one or more attack methods indicated by the global cyber attack data.

Further disclosed is a decision support system comprising at least one hardware processor configured to collect global cyber attack data from a networked resource, collect organizational profile data from a user, wherein the organizational profile data comprises types of computerized defensive controls employed by the organization, a maturity of each of the computerized defensive controls and organizational assets each associated with at least one of the computerized defensive controls, compute a cyber attack risk of the organization in real time, by continuously performing said collecting of global cyber attack data and comparing the global cyber attack data to the organizational profile data, to compute a cyber attack risk score for each of the organizational assets, and supporting a decision on improvement of one or more of the computerized defensive controls by providing a risk simulator configured to compute an effect of improving one or more of the computerized defensive controls on the cyber attack risk score.

In some embodiments, the risk simulator may be further configured to perform the computing of the effect for each of different ones of the computerized defensive controls, and to compute a tradeoff between improvement of different ones of the computerized defensive controls and the cyber attack risk score.

In some embodiments, the at least one hardware processor may be further configured to compute a success probability score of one or more attack agents indicated by the global cyber attack data.

In some embodiments, the at least one hardware processor may be further configured to compute a success probability score of one or more attack methods indicated by the global cyber attack data.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A system and a method for cyber attack analyzing, surveying, categorizing, risk assessing, and decision supporting are disclosed herein. The system and method may be highly advantageous to organizations which are threatened by cyber attacks.

The system may include central components which are common and maintained by the system provider, and to local components which holds specific data regarding the certain protected organization. The system may rely on a CCIAS (Central Cyber Intelligence and Analytical Services) which is a set of cyber data best practices, kept in CCIAD (Central Cyber Intelligence and Analytical Data) repository and correspondent software that may allow manipulating this data. CCIAD may keep all analytical models of the cyber data, including maintained environments (controls and assets), maintained threat agents (attackers and attack methods), and maintained list of organization profiles. There may be only one instance of CCIAD. Authorities of the system provider are responsible for keeping this database updated with the latest data and initiating synchronization between CCIAD and LCIAD (Local Cyber Intelligence and Analytical Data) of each customer organization. CCIAD may contain best practices of all maintained data and its maturity.

Figure 1:
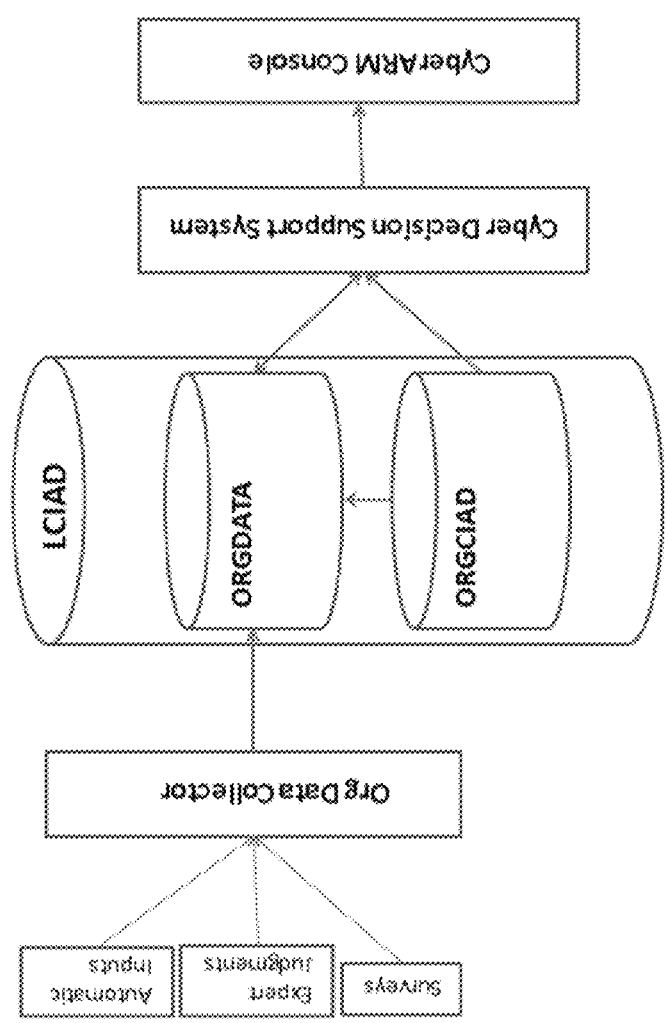
FIG. 1 shows a flowchart of a system process.

The present system and method may be better understood with reference to the accompanying figures. Reference is now made to FIG. 1, which shows a flowchart of the system process. The system may include an organizational data collector which may use to input data to the system, an LCIAD, an ORGDATA (Organizational Data) which may contain organizational specific data necessary for cyber data analysis, an ORGCIAD (Organizational Cyber Intelligence and Analytical Data) which may hold cyber data analyses and calculations essential to the organization, a CDSS (Cyber Decision Support System) which may assist the organization stakeholders to make the right decision, and a console through which the user may interfaces the system.

Organizational data input component may allow entering actual data for actual control scoring. There may be 3 possible sources of input: automatic which is integration with controls, surveys which are questionnaires of one to many people via external survey system, and expert judgment via the system UI (User Interface). In cases when the input on the same control may come from several sources, the system may make its best to resolve conflict of opinions automatically according to following priorities: expert Judgment, automatic input, and survey. In case there are several inputs from survey, the system may choose automatically the worst case opinion. In any case of multiple inputs for single control, the system may send email and set an internal alert for cyber professional(s). Cyber professional may interfere and override automatic opinion selection.

All actions fulfilled by the personas, such as logging into the system, cyber professional override of automatic opinion selection, provisioning and other operations may be registered by the system in the audit log. Each record may contain the date and time (time stamp) of the action, person that fulfilled the action, action description and object(s) that underwent the action.

ORGCIAD may contain local view-only replica of CCIAD, i.e. all data about registered and maintained in the CCIAD threat agents and environments, and customer specific control definitions. Objects which may be synchronized from CCIAD may include assets, controls, maintained attackers and attack methods, maintained organization profiles, calculated attack scores, and all relevant relations between objects above. Each customer may define locally which assets and controls are applicable for its organization, as well as define new assets and controls.

ORGDATA may contain following types of data organizational structure described by the hierarchy of enterprise, systems and environments, enterprise profile which is a definition of the enterprise category as related to cyber attacks probability (enterprise profile definition may use categories of organization profiles kept in CCIAD), ORGCI (Organization Control Implementation) which is an implementation of controls within organizational systems (ORGCI contains control policies with Scoring rules expected in the specific control usage), actual control implementation which is an actual control implementation based on the control cyber status received from organization data input, and actual control implementation history which is the history of all actual control implementations based on the control cyber status received from organization data input.

CDSS may be actually an engine that combines relevant data from ORGCIAD and ORGDATA, calculates actual organization risk assessments and transforms them into the convenient for representation format, allows to simulate various control and attack status scenarios, and transforms results of the simulation into representation format. Upon input from organizational data input layer, the system may automatically match value representing control status to the policy scoring rules, and define an actual maturity level of controls.

The console may serve for management purposes, and usable and intuitive representation of the results provided by the CDSS. CDSS results may be provided in the form of dashboards and/or reports. The system may also be provided for mobile devices.

Figure 2:
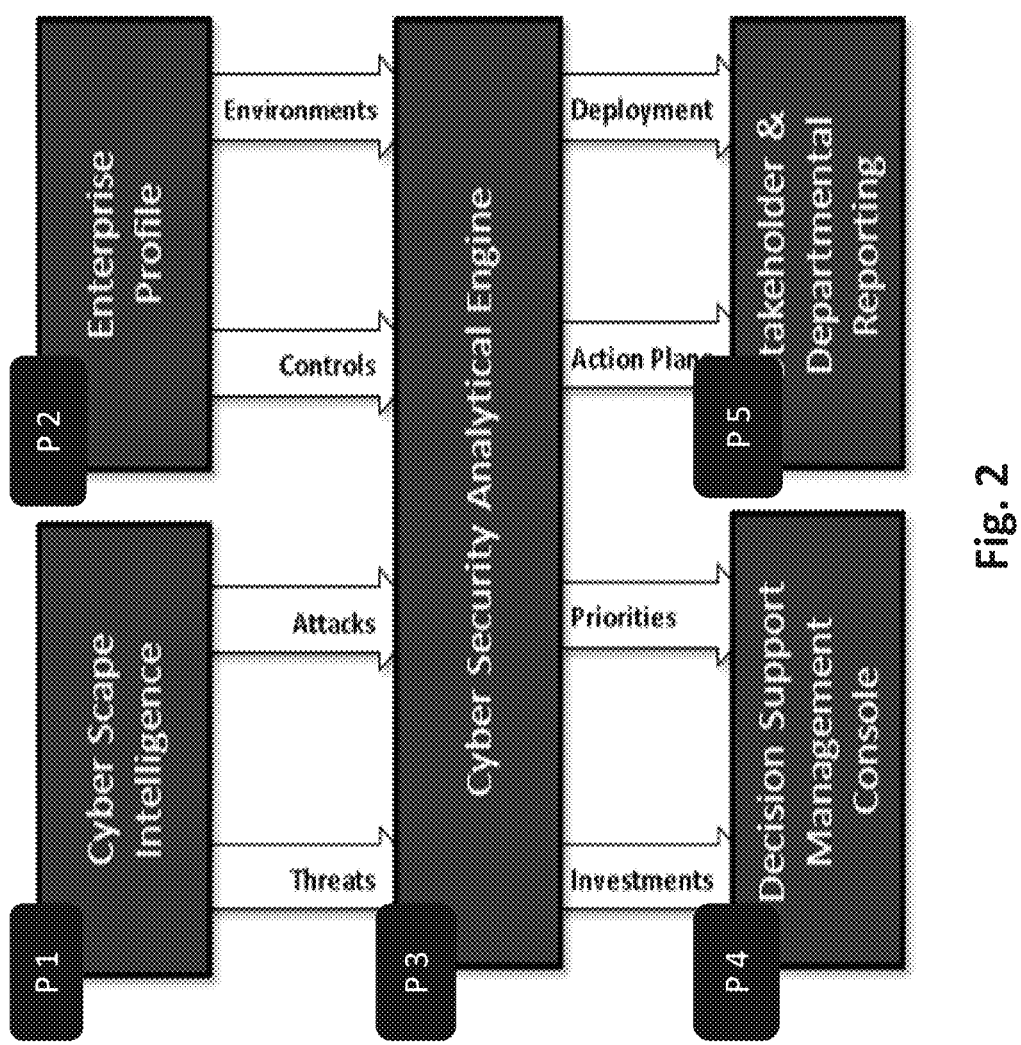
FIG. 2 shows a block diagram of a risk assessment process.

Reference is now made to FIG. 2, which shows a block diagram of a risk assessment process. The depicted functionalities are described as follows: Cyber space intelligence (P1) may stands for a functionality to gather and digest intelligence for clients, tailored to company peer group—compare to company profile; enterprise profile (P2) may stand for a functionality to gather & standardize intelligence on internal threats, company business landscape, network environments, controls in place and attack history; cyber security analytical engine (P3) may stand for proprietary algorithms to calculate likelihood of a successful attack from attackers who would benefit from disrupting/stealing from the company; decision support management console (P4) may stand for a collection of high level dashboards customized for client management team to quickly summarize current situation and make decisions on how to allocate limited financial & defensive resources to the most likely threats; and stakeholders & departmental reporting (P5) may stand for a client organization custom reports to detail the current status of defenses and the risks to the company, each environment and system, stakeholder actionable and organization accountable.

The process methodology unfolds as follows: P1 and P2—may gather internal and external intelligence for the cyber attack landscape and company situation; P3—may calculate probabilities for likelihood of successful attack by relevant attackers, likelihood of successful attack for each environment, likelihood of success of various attack methods, current of maturity of deployed controls, and overall importance of each control in resisting multiple attack methods; P4—may support management decision making with re-assessments for changes in defensive posture or cyber landscape—resource deployment decisions; and P5—may support stakeholder enfranchisement with detailed department situational reports and remediation strategies.

Figure 3:
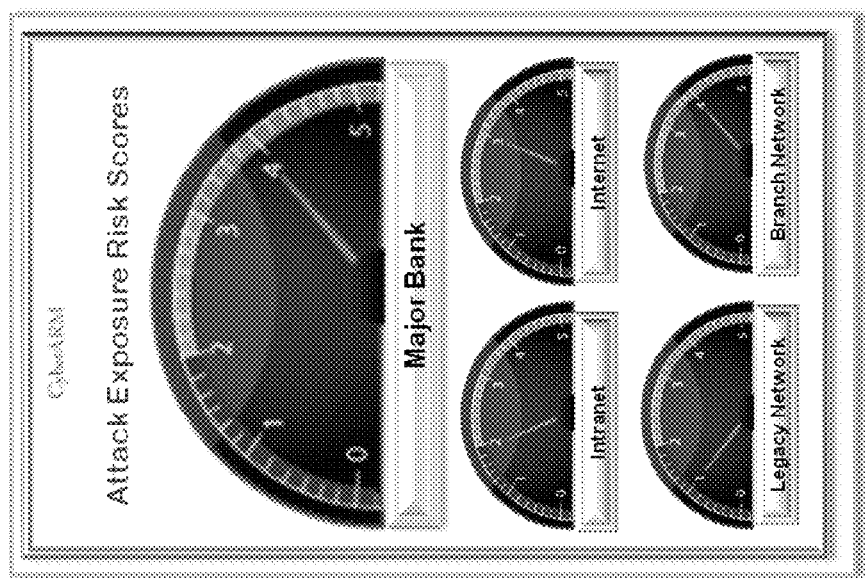
FIG. 3 shows an example of management console of organization attack risks.

Reference is now made to FIG. 3, which shows an example of management console of organization attack risks. The top gauge indicates the overall enterprise attack risk score, and may be calculated by the analytical engine. The four lower gauges indicate individual environments attack risk scores, and may be calculated by the analytical engine. Each individual environment may have a drill down button enabling to see threat agents, controls, attack methods, and Security gaps.

The two parties taking part in cyber war are the attackers and the organizations being attacked. For cyber aspects, the organization may be described by enterprises, environments (e.g. web sites, network hardware, software systems, cloud services, etc.), assets, technologies, controls and organizational profile.

Figure 4:
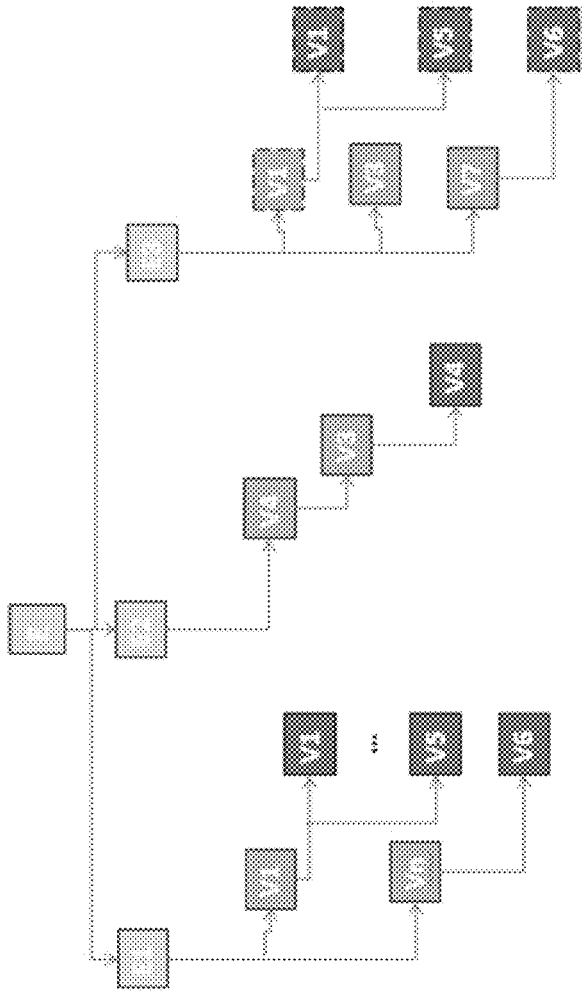
FIG. 4 shows an example of a block diagram for organizational hierarchy.

Reference is now made to FIG. 4, which shows an example for block diagram of organizations hierarchy. Enterprises may have enterprise and environment type children, while environments may have environment type children.

The assets are the business assets that are undergoing attack (e.g. customers data base, intellectual property, company reputation, etc.). Assets are located in the environments (many-to-many relation). Same asset may appear in many environments. The variety of assets is maintained in the assets Catalog of CIAS and may be modified only by the system provider authorities. Customers may not add their own assets. If a customer requires new asset, he may contact CIAS for appropriate definition.

The technologies define the relevance of an attack vector to the attack objective (e.g. web server, database, operational system, etc.). i.e., if a certain technology is not used in an environment, the attack vectors and objective are not relevant. Technologies reside in the environments (many-to-many relation). Same Technology can appear several times in various environments.

The controls are the business assets that are used to protect assets (e.g. firewall, antivirus, security officer, etc.). Control group is a set of controls used for cyber protect against specific attack method. Control Group can contain one-to-many Controls. Some of the Controls in a specific Control Group, defined in CCIAD, are mandatory for implementation in the organization for successful protection against corresponding attack method. Mandatory Controls will be marked accordingly by the flag.

Organization Profile represents organization profile category that should be taken into consideration during definition of the organization defend ability. The variety of organization profiles treated is defined and initiated in the CCIAD repository. List of treated organization profiles is maintained and can be modified only by the system provider authorities. Organization profile is defined for an enterprise object. Organization profile of the root enterprise object in the specific customer implementation is an aggregation of profiles defined for all child Enterprise object. Organization profiles can be defined by categories: geography, geopolitical, timing, industry sector, etc. Each category can be defined by a set of subcategories.

Attacker may be an individual or an organization or a team of individuals or any other entity that plans and performs cyber attacks on the organizations. Each attacker may implement several applicable attack methods. Any attack method may be used by several attackers (many-to-many relation). The variety of treated attackers may be maintained in the attackers' catalog of CIAS and may be modified only by the system provider authorities. Customers may not add their own attackers.

For cyber aspects, the attacker may be described by skills, resources, and internal accessibility.

The attacker skills may be one of the following: none, minimal, operational or adept.

The attacker resources may be one of the following: individual, team, organization, government.

The attacker internal accessibility may be true (i.e. the attacker may attack internal environments) or false.

Probability of attack may be an assessment based on the gathering of intelligence as to the probability that an attack from this agent may occur. Probability of attack is applicable to organizations via organization profile. It reflects an attacker's motivation to attack specific organization profile, and may be calculated by CIAS, based on previous year trends, events and expert opinion.

Attacker may have several objectives, such as destroy, copy, change, etc. Each objective can be achieved by several attack vectors. Attacker's objectives may have relevancy to specific assets. The variety of treated attacker objectives may be maintained in the attacker objectives catalog of CIAS and may be modified only by the system provider authorities. Customers may not add their own attacker objectives.

Attack vector is a set of mandatory attack methods that have to be fulfilled in order to succeed in the attack. Each attack method in the vector has to be performed one by one. Each attack vector has relevancy (many-to-many relation) to technologies. The variety of treated attack vectors may be maintained in the attack vector catalog of CIAS and may be modified only by the system provider authorities. Customers may not add their own attack vectors.

Figure 5:
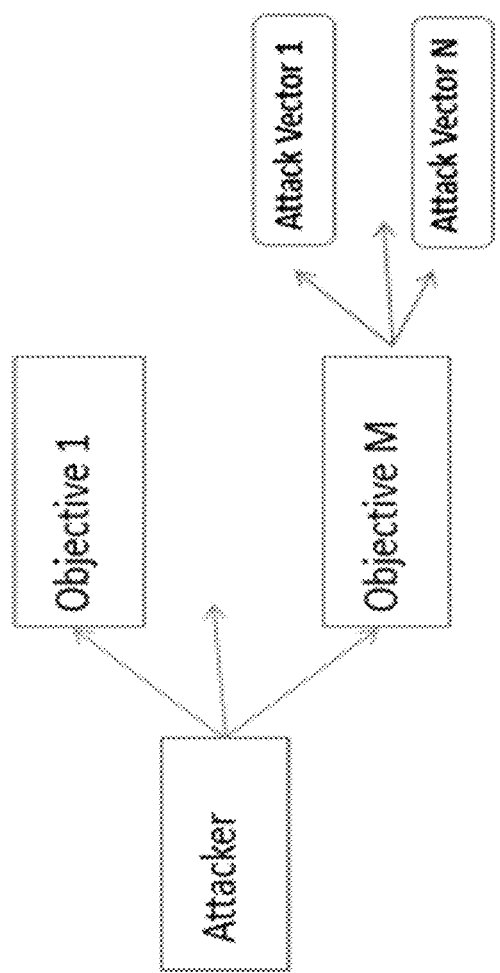
FIG. 5 shows an example of a block diagram of attacker objective and vector hierarchy.

Reference is now made to FIG. 5, which shows an example for block diagram of attacker objective and vector hierarchy.

Attack methods may be a way of how attack is organized by the attacker. Each attacker may implement several applicable attack methods. Any attack Method may be used by several attackers (many-to-many relation). Each attack method may have relevancy (many-to-many relation) to control groups. The variety of treated attack methods may be maintained in the attack methods catalog of CIAS and may be modified only by the system provider authorities. Customers may not add their own attack methods.

The attack method may be described by skills (none, minimal, operational or adept) and resources (individual, team, organization, government). In case skill or resource value of the attacker is less than skill or resource of the attack method, the Attacker may not apply this attack method which, in turn, means that the whole attack vector may not be implemented by attacker.

The organization order of action using the system may be as follows: organization profile categories definition, enterprise and environment trees definition, for each environment define set of assets from CIAS assets catalog, for each environment define set of technologies from CIAS, for each environment mark set of controls from CIAS controls catalog list filtered using the list of attack methods defined, for each selected control provide its actual maturity. Assets, technologies and controls may be defined for each environment.

This may finally yield a hierarchy of enterprises and environments, a list of relevant attackers and objectives, a list of relevant attack methods and attack vectors, a list of actual assets and technologies used in the organization, and a list of actual controls and their groups implemented in the organization.

According to the flow above, list of attackers may be comprised through two not connected paths: via organization profile and via attacker objective and its relation to assets. To avoid ambiguity, it may be assumed that primary list of attackers may be identified by attacker objectives and environment assets.

Figure 6:
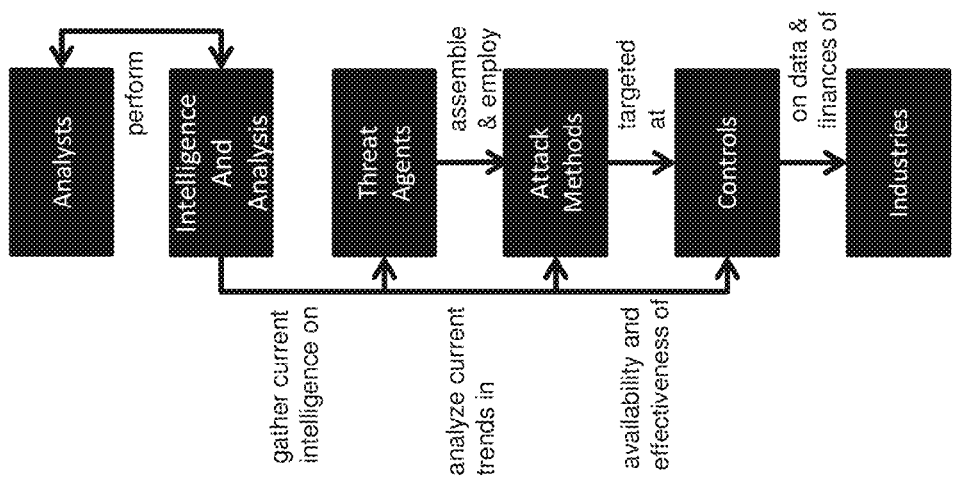
FIG. 6 shows a block diagram of a cyber space external intelligence process.

Reference is now made to FIG. 6, which shows a block diagram of a cyber space external intelligence process. The depicted functionalities are described as follows: intelligence & analysis may stand for periodic research and gathering of intelligence on the state of the cyber landscape and tailoring it to the client organization. Intelligence, research and analysis may be tailored to the client on-demand and may be provided for each risk attack assessment. Threat agents may stand for any individual or organization that has the motivation and the capability to carry out a cyber attack. Many interest groups have adopted this strategy for pursuing their aim, including terrorists, foreign governments and their agents for purposes of espionage, foreign governments and their agents for purposes of warfare, social, political and economic radical activists, and criminal individuals and organizations for the purposes of illicit financial gain. Current potential attackers' analysis may include their objectives, capabilities, and resources. Attack methods may be defined as taking advantage of vulnerability in a computer or network to gain access to critical components or data in a system with the intent of vandalizing, stealing or denying access to that component or information. Attack methods may be constantly growing in numbers due to The increases in available technology for computing and networking, the constant increase/releases in features and functionality in network infrastructure components, the lack of adequate standards and practices of developers of applications that utilize these networks for delivering products and services, the growing number of potential threat agents with agendas that can be met by compromising networks. Attack methods employed by attackers may be linked to control effectiveness. Controls may stand for mechanisms embedded in or external to the computer and network facilities whose purpose are to prevent unauthorized access and detect access when a breach has occurred. The deployment of controls defines a defensive posture. At the highest level controls are characterized as human resources, policies and practices, and technology resources. Current importance of controls may be relative to blocking multiple attack methods. Analysis of current cyber security landscape, attacks, best practices may be made industry-wise.

PoA (Probability of Attack) reflects the score of attacker's relevancy for specific enterprise.

POA may be calculated as follows: CCIA (Central Cyber Intelligence and Analysis) Manager may define PoA score in the range of [1-5] for attacker per profile category. Zero (0) level or an absence of the relation between profile category and attacker may mean that the attacker is not relevant for this category. Actual PoA by attacker on the enterprise may be calculated using enterprise-profile category relation, defined in LCIAD. To summarize, attacker→profile category→enterprise path may define relevancy of specific attacker for specific enterprise via its category and is may be translated to PoA.

Control may be defined by description, type, rank, and policies with their weights and set of scoring rules. Control may be represented by hierarchy of controls. Policies are defined only for leaf controls in the tree.

Control Implementation may be an internal control usage within a specific customer enterprise and/or environment. A distinguish between enterprise level control implementation and environment level control implementation may be done. Best practice policies and scoring rules criterions may come from CIAS. Specific control implementation may be defined by the specific internal criterions of the policy scoring rules that, if defined, may override inherited criterions. In other words, customers may override criterions and may also add/delete scoring rules in their implementations. In both levels of control definition, including its policies may be inherited from the ORDCIAD and only criterions may be overridden. Algorithm of choosing relevant criterions for a specific scoring rule may be environment control implementation (if defined), organization control implementation (if defined), and ORGCIAD control definition.

OCM (Optimal Control Maturity) may be control maturity score calculated based on the best practices of CIAS and provided to the customer's ORGCIAD from CCIAD. Usually, it may be 100%.

ECM (Expected Control Maturity) may be control maturity score calculated based on the control implementation in the organization. In case the customer may not override scoring rules recommended by CIAS, ECM may be equal to OCM (which is also the default value).

ACM (Actual Control Maturity) may be the score compliance represents actual compliance to the CIAS and organization specific control policy. Actual control maturity scores may be calculated based on the actual value representing fulfillment of the control policy in the organization. These values are entered to the system via organizational data collecting component.

There are two ACM scores: as related to OCM, defined by CCIAD, and/or as related to organization specific ECM, defined in the organization or on the level of organization or on the level of corresponding environment/system. ACM score as related to CCIAD definitions may be considered to be a main ACM score index.

Control maturity scoring may be a process of calculating control maturity based on the control policies definition. Each leaf control can have a set of policies (many to one relation). For example, firewall rule base has to undergo upgrade, each HR person has to undergo polygraph each 1 month, etc.

Policy may defined by description, weight and set of scoring rules with one of them marked as recommended. Each scoring rule may be defined by a Criterion hat, if achieved, represents specific Level of policy Fulfillment. There may be only one Criterion in a scoring rule. Fulfillment level may be represented by percentage (%) of policy accomplishment. Set of scoring rules can be represented by a table with columns: Criterions and Fulfillment Level (%) sorted ascending by criterions column.

In the following example criterions are shown in italic, and fulfillment levels are shown in bold. Criterion "5" is the recommended one:

Policy: firewall rule base has to undergo upgrades.
Scoring Rules:
Firewall rule base is updated once in 3 months—100%
Firewall rule base is updated once in 5 months—80%
Firewall rule base is updated once in 7 months—50%
Firewall rule base is updated once in 9 months—30%
Firewall rule base is updated rarely than in 12 months—0%

Overachieving of the policy (meaning achieving more than 100% of fulfillment) may be alerted by the system, because it may mean that the organization may waste its effort.

CCIAD and ORGCIAD may contain controls definition maintained by that may include control description (descriptive definition, type and rank), and control policies which may be descriptions+set of policies defined by description, weight, and a set of scoring rules. Policies fulfillment may be defined for a specific control in a specific environment represents control maturity score.

Actual PFL (Policy Fulfillment Level) may be defined for a value representing policy fulfillment of a specific control in a specific system.

Algorithm may be a process of choosing matching scoring rule with a criterion nearest to a value representing policy fulfillment of a specific control. The algorithm may track the set of scoring rules starting from the scoring rule with a maximum criterion and down, find the first scoring rule with criterion equal or less than the value, and if the value is less than the minimal criterion, it may take the best case scoring rule and may alert of overachievement. For the example above, for the value=8, fulfillment level will be 50%. If the value is 5, fulfillment level will be 80%. For the value=2, fulfillment level will be 100% and system should alert on overachievement.

The ACM score may be calculated as a weighted average of all policies' fulfillment levels, i.e. $ACM = SUM[WTP_1*PFL_1/100 : WTP_n*PFL_n/100]*100$.

PoS (Probability of Success) may reflect capability of specific attack method to break through applicable CGs (control groups) targeted to resist attacks originated by the attack method.

Figure 7:
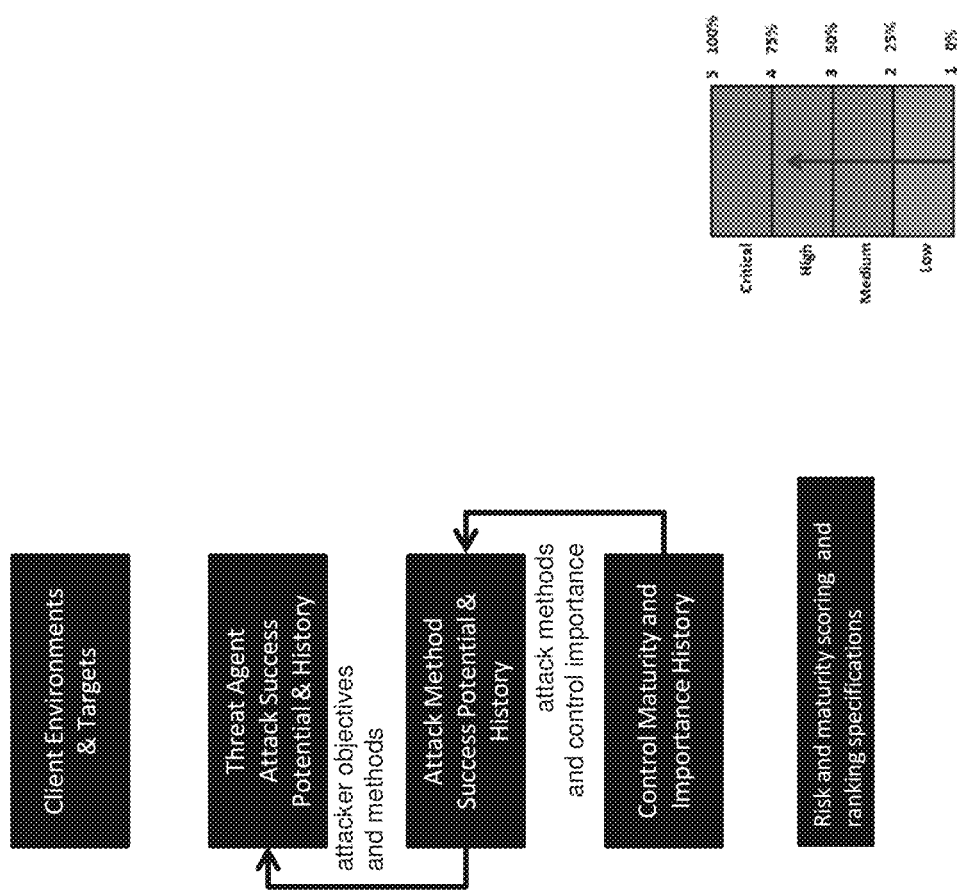
FIG. 7 shows a block diagram of an enterprise risk/exposure probability score calculation process.

Reference is now made to FIG. 7, which shows a block diagram of an enterprise risk/exposure probability score calculation process. The depicted functionalities are described as follows: threat agents—company relevant profiles risk scores and rankings; attack methods—risk of attack success; and controls—overall maturity and importance in defensive strategy. All of the assessments may be done in view of historical repository of current and past efforts, and of company customized hierarchies for accountability and action.

Capability of control to withstand relevant attack methods may be represented by the control maturity score. Attack method can be related to several control groups. Thus, attack method PoS may be an aggregation of the PoS calculated per control group. PoS per one control group may be calculated as a multiplication of weighted maturity scores of all controls in the group. Controls marked as mandatory in the control group may have to be implemented in the organization to achieve accepted protection against specific attack method. WT (WeighT) of specific control in relation to attack method may be defined by CIAC (Cyber Intelligence Analytics Center).

PoS of control group may be calculated as:

$$PoS(CG)=MUL[(1-WT1*ACM1):(1-WTn*ACMn)]*100\%$$

If the ACM of one of the mandatory controls is <10%, then PoS (CG)=100%

Taking into consideration that people may not give weights normalized to 100%, meaning the SUM of weights won't be 100%. Given weights may rather represent relational weights between controls in the group. Thus, for final calculation all given weights may have to be normalized to 100% as follows:

$$WT1(norm) = WT1 * 1/\text{sum}[WT1:WTn]$$
$$\ldots$$
$$WTn(norm) = WTn * 1/\text{sum}[WT1:WTn]$$

For example, there are two controls in the Group with following parameters: Control 1: WT1=0.5 (50%), ACM1=60%; Control 2: WT2=0.2 (20%), ACM2=20%. Normalized to 100% weights will be: WT1(norm)=0.714; WT2(norm)=0.286. And PoS=((1−(0.714*0.6))*(1−(0.286*0.2))*100=(0.571*0.943)*100=0.538*100=53.8%.

If in the certain group a mandatory control is absent, this means that this group's PoS is 100%.

Each AM (Attack Method) may be associated with several CGs (Control Groups). PoS of the AM is calculated as a MN of all PoS of all associated CGs:

$$PoS(AM)=MIN[PoS(CG1):PoS(CGn)]$$

There might be several attack methods relevant for the set of controls and their groups. Actual PoS may be calculated for all combinations of attack methods verses all related control groups defined in the LCIAD. In case the enterprise is described as a hierarchy of enterprises/environment PoS of attack method is aggregated to the higher levels per attack method type (SQL injection, etc.).

AV (Attack vector) may be a set of AMs (Attack Methods) that may have to be performed one by one to accomplish the attack.

$$PoS(AV)=MUL[PoS(AM1)/100:PoS(AMn)/100]*100$$

If one of the AMs in the AV nay not be performed, then PoS of the whole AV may be 0%.

Calculation of the PoS of the attacker objective may be based on the relation between objective and attack vectors required to perform this objective.

$$PoS(AObj)=MAX[[(PoS(AV1):PoS(AVn)]$$

Calculation should be performed for all combinations of all objectives↔attack vectors.

Max possible attacker's PoS may be calculated for each attacker as a MAX of all PoS of its related objectives.

$$\text{Max PoS(Attacker)}=MAX[PoS(AObj1):PoS(AObjn)]$$

At the enterprise level likely possible attacker's PoS is calculated for each attacker $$PoS(\text{attacker})=PoA*MAX\ PoS(\text{attacker})$$

Where PoA is Probability of Attack defined by the enterprise organization profile.

Figure 8:
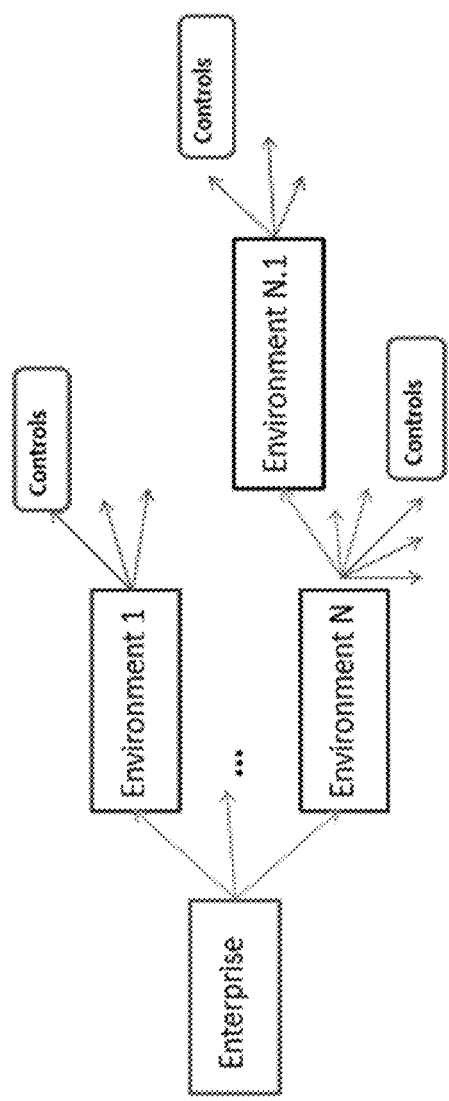
FIG. 8 shows a block diagram of a PoS (Probability of Success) aggregation.

Reference is now made to FIG. 8, which shows a block diagram of PoS aggregation to higher levels. Aggregation to the higher level of the environment may be performed for PoS of attack method (PoS (AM)). PoS of Attack Vectors, Attack Objectives and Attackers may be calculated from the aggregated values of PoS (AM) correspondingly. All aggregations of attack methods may be performed as an average separately per specific type of attack method. For example, aggregation of all instances of SQL injection attacks method. As a result at the level of each environment and enterprise, we have a set of PoS per specific type of attack method. Attack vectors PoS (AV) may be calculated at each level of environment/enterprise from the aggregated PoS (AM). Attacker objective PoS (AObj) may be calculated at each level of environment/enterprise from calculated PoS (AV) of the corresponding environment/enterprise. Attacker PoS (Attacker) may be calculated at each level of environment/enterprise from calculated PoS (AObj) of the corresponding environment/enterprise.

Aggregation formula may calculate average PoS of all related components, not regarding whether these components are of enterprise, environment or control group types. PoS of the environment may be an average of PoS of all attack methods of all control groups that reside in the environment.

$$PoS(\text{AM env})=AVG[(PoS(AM1):PoS(AMn)]$$

PoS of the environment that contains other environment and direct control groups may be an average of the aggregated PoS of sub-environments (PoS (ENV envj)) and PoS of attack methods of all control groups (PoS (AM envi)), all per specific attack method. PoS of the enterprise that contains other enterprises and direct environments may be an average of PoS of all enterprises and all environments that reside in the enterprise, all per specific attack method.

Control Importance may be calculated based on the simulation in two phases: Phase 1—calculating control importance by simulation of changing control maturity by 10% in each round, and notice the aggregated environment/enterprise risk score changing, and Phase 2—calculating control importance by simulation of changing control maturity by 10% in each round per sets of controls, and notice the aggregated environment/enterprise risk score changing.

Sets of controls to be implemented by the organization might be recommended, for the optimal way to protect itself.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A method for cyber attack risk assessment, the method comprising operating at least one hardware processor for:
   automatically conducting a cyber space external intelligence process that comprises periodically gathering intelligence on the state of a cyber landscape which is external to an organization for which the method is performed, wherein the intelligence comprises:
   (a) data on threat agents that have motivation and capability to carry out a cyber attack, the data comprising at least one of: objectives of the threat agents, capabilities of the threat agents, and resources of the threat agents, and
   (b) data on attack methods that are used for gaining access to critical components in a system or data in the system, wherein the gaining of access is with the intent of at least one of vandalizing, stealing, and denying access to the critical components in the system or the data in the system, respectively;
   collecting organizational profile data from a user, wherein the organizational profile data comprises: types of computerized defensive controls employed by the organization, a maturity of each of the computerized defensive controls comprising a level of fulfillment capability for each of the computerized defensive controls with respect to a control policy of the organization, and organizational assets each pertaining to a business environment and each associated with at least one of the computerized defensive controls;
   computing a cyber attack risk of the organization in real time and automatically, by continuously conducting the cyber space external intelligence process and comparing the cyber space external intelligence to the organizational profile data, to compute a cyber attack risk score for each of the organizational assets; and
   issuing an overachievement alert when any of the levels of fulfillment of any of the computerized defensive controls exceeds the control policy of the organization, in accordance with a recommended scoring rule, to thereby prevent a waste of fulfillment effort.

2. The method according to claim 1, further comprising providing a risk simulator configured to compute an effect of improving one or more of the computerized defensive controls on the cyber attack risk score.

3. The method according to claim 2, wherein said risk simulator is further configured to perform the computing of the effect for each of different ones of the computerized defensive controls, and to compute a tradeoff between improvement of different ones of the computerized defensive controls and the cyber attack risk score.

4. The method according to claim 1, further comprising displaying a dashboard comprising the cyber attack risk score for each of the organizational assets.

5. The method according to claim 4, wherein said displaying of the dashboard further comprises enabling a drill-down into one or more of the organizational assets, to display one or more computerized defensive controls associated with the one or more of the organizational assets.

6. The method according to claim 4, wherein the dashboard comprises a graphical, dynamic gauge for each of the organizational assets.

7. The method according to claim 1, further comprising computing a success probability score of one or more attack agents indicated by the cyber space external intelligence.

8. The method according to claim 1, further comprising computing a success probability score of one or more attack methods indicated by the cyber space external intelligence.

9. A non-transient computer readable medium having stored thereon instructions that, when executed by at least one hardware processor, cause the at least one hardware processor to:
   automatically conducting a cyber space external intelligence process that comprises periodically gathering intelligence on the state of a cyber landscape which is external to an organization for which the method is performed, wherein the intelligence comprises:
   (a) data on threat agents that have motivation and capability to carry out a cyber attack, the data comprising at least one of: objectives of the threat agents, capabilities of the threat agents, and resources of the threat agents, and
   (b) data on attack methods that are used for gaining access to critical components in a system or data in the system, wherein the gaining of access is with the intent of at least one of vandalizing, stealing, and denying access to the critical components in the system or the data in the system, respectively;
   collect organizational profile data from a user, wherein the organizational profile data comprises types of computerized defensive controls employed by the organization, a maturity of each of the computerized defensive controls comprising a level of fulfillment capability for each of the computerized defensive controls with respect to the control policy of the organization, and organizational assets each associated with at least one of the computerized defensive controls;
   compute a cyber attack risk of the organization in real time and automatically, by continuously conducting the cyber space external intelligence process and comparing the cyber space external intelligence to the organizational profile data, to compute a cyber attack risk score for each of the organizational assets; and
   issuing an overachievement alert when any of the levels of fulfillment of any of the computerized defensive controls exceeds the control policy of the organization, in accordance with a recommended scoring rule, to thereby prevent a waste of fulfillment effort.

10. The non-transient computer readable medium according to claim 9, wherein the instruction further cause the at least one hardware processor to provide a risk simulator configured to compute an effect of improving one or more of the computerized defensive controls on the cyber attack risk score.

11. The non-transient computer readable medium according to claim 10, wherein said risk simulator is further configured to perform the computing of the effect for each of different ones of the computerized defensive controls, and to compute a tradeoff between improvement of different ones of the computerized defensive controls and the cyber attack risk score.

12. The non-transient computer readable medium according to claim 9, wherein the instruction further cause the at least one hardware processor to display a dashboard comprising the cyber attack risk score for each of the organizational assets.

13. The non-transient computer readable medium according to claim 12, wherein said display of the dashboard further comprises enabling a drill-down into one or more of the organizational assets, to display one or more computerized defensive controls associated with the one or more of the organizational assets.

14. The non-transient computer readable medium according to claim 12, wherein the dashboard comprises a graphical, dynamic gauge for each of the organizational assets.

15. The non-transient computer readable medium according to claim 9, wherein the instruction further cause the at least one hardware processor to compute a success probability score of one or more attack agents indicated by the cyber space external intelligence.

16. The non-transient computer readable medium according to claim 9, wherein the instruction further cause the at least one hardware processor to compute a success probability score of one or more attack methods indicated by the cyber space external intelligence.

17. A decision support system comprising at least one hardware processor configured to:
   automatically conducting a cyber space external intelligence process that comprises periodically gathering intelligence on the state of a cyber landscape which is external to an organization for which the method is performed, wherein the intelligence comprises:
   (a) data on threat agents that have motivation and capability to carry out a cyber attack, the data comprising at least one of: objectives of the threat agents, capabilities of the threat agents, and resources of the threat agents, and
   (b) data on attack methods that are used for gaining access to critical components in a system or data in the system, wherein the gaining of access is with the intent of at least one of vandalizing, stealing, and denying access to the critical components in the system or the data in the system, respectively;
   collect organizational profile data from a user, wherein the organizational profile data comprises types of computerized defensive controls employed by the organization, a maturity of each of the computerized defensive controls comprising a level of fulfillment capability for each of the computerized defensive controls with respect to the control policy of the organization, and organizational assets each associated with at least one of the computerized defensive controls;
   compute a cyber attack risk of the organization in real time an automatically, by continuously performing said cyber space external intelligence process and comparing the cyber space external intelligence to the organizational profile data, to compute a cyber attack risk score for each of the organizational assets;
   supporting a decision on improvement of one or more of the computerized defensive controls by providing a risk simulator configured to compute an effect of improving one or more of the computerized defensive controls on the cyber attack risk score; and
   issuing an overachievement alert when any of the levels of fulfillment of any of the computerized defensive controls exceeds the control policy of the organization, in accordance with a recommended scoring rule, to thereby prevent a waste of fulfillment effort.

18. The decision support system according to claim 17, wherein said risk simulator is further configured to perform the computing of the effect for each of different ones of the computerized defensive controls, and to compute a tradeoff between improvement of different ones of the computerized defensive controls and the cyber attack risk score.

19. The decision support system according to claim 17, wherein the at least one hardware processor is further configured to compute a success probability score of one or more attack agents indicated by the cyber space external intelligence.

20. The decision support system according to claim 17, wherein the at least one hardware processor is further configured to compute a success probability score of one or more attack methods indicated by the cyber space external intelligence.

* * * * *